United States Patent [19]

Prasser

[11] Patent Number: 5,687,707
[45] Date of Patent: Nov. 18, 1997

[54] COMBINATION COOK STOVE HEAT EXCHANGER AND FILTER

[75] Inventor: Robert Henry Prasser, Vail, Colo.

[73] Assignee: Hydro Hoods Corporation, Denver, Colo.

[21] Appl. No.: 727,554

[22] PCT Filed: Sep. 20, 1994

[86] PCT No.: PCT/US94/10631

§ 371 Date: Oct. 24, 1996

§ 102(e) Date: Oct. 24, 1996

[87] PCT Pub. No.: WO95/11410

PCT Pub. Date: Apr. 27, 1995

Related U.S. Application Data

[63] Continuation-in-part of Ser. No. 139,282, Oct. 19, 1993, Pat. No. 5,456,244.

[51] Int. Cl.⁶ .................................................. F24C 15/20
[52] U.S. Cl. ........................... 126/299 D; 126/299 R; 165/166; 55/DIG. 36
[58] Field of Search ................. 126/299 D, 299 R, 126/299 A; 165/166; 99/403; 55/DIG. 36, 316, 220, 227

[56] References Cited

U.S. PATENT DOCUMENTS

| | | | |
|---|---|---|---|
| 3,260,189 | 7/1966 | Jensen | 98/115 |
| 3,698,378 | 10/1972 | Rosenberg et al. | 126/39 |
| 3,827,343 | 8/1974 | Darm | 165/166 |
| 4,050,368 | 9/1977 | Eakes | 98/115 |
| 4,084,745 | 4/1978 | Jones | 237/8 |
| 4,122,834 | 10/1978 | Jacobs | 126/299 |
| 4,175,614 | 11/1979 | Huggins | 165/95 |
| 4,235,220 | 11/1980 | Hepner | 126/299 |
| 4,769,149 | 9/1988 | Nobilet et al. | 210/603 |
| 5,524,607 | 6/1996 | Grohman et al. | 126/299 |
| 5,558,080 | 9/1996 | Grohman et al. | 126/299 |

FOREIGN PATENT DOCUMENTS

| | | |
|---|---|---|
| 829965 | 10/1975 | Belgium . |
| 899292 | 7/1984 | Belgium . |
| 003665981 | 9/1981 | European Pat. Off. . |
| 021809 | 10/1984 | European Pat. Off. . |
| 2443033 | 8/1980 | France . |
| 2482703 | 11/1981 | France . |
| 522377 | 9/1976 | U.S.S.R. . |

OTHER PUBLICATIONS

1991 Sweet's Catalog Identifying a "Range Guard" Grease Filter.

*Primary Examiner*—Larry Jones
*Attorney, Agent, or Firm*—Sheridan Ross P.C.

[57] ABSTRACT

A combined self-cleaning grease and particulate filter and heat exchanger used to collect thermal energy normally vented through flue hoods or other ventilation systems in commercial or institutional kitchens. Fluids circulated within the heat exchanger/filter may then be utilized for heating other mediums, such as water or air, and to promote drainage of the particulate matter and grease from the filter into a removable storage container. The heat exchanger/filter is provided with means for quick assembly and designed to replace existing grease filters, thus allowing economical retrofitting. A baffle filter is further provided which utilizes particular flow patterns to promote a more efficient transfer of grease and particulate matter from the airborne fumes to the filter.

43 Claims, 8 Drawing Sheets

COMBINATION COOK STOVE HEAT EXCHANGER AND FILTER

This is a 371 of PCT/US94/10631, filed Aug. 20, 1994, and a continuation-in-part application of 08/139,282 filed Oct. 19, 1993, now U.S. Pat. No. 5,456,244 issued on Oct. 10, 1995.

FIELD OF THE INVENTION

The present invention relates to a combined system which simultaneously filters grease and airborne particulate matter from hot fumes and transfers heat to a fluid circulating inside the system. The heated fluid may then be used to supply heat for other purposes, such as heating water or air. In addition, the system of the present invention provides quick connect means for attaching sections of the combined heat exchanger/filter, allowing the system to be retrofitted in existing flue hood ventilation systems of varying dimensions in an economical manner. The filter may be attached to or in close proximity to the heat transfer mechanism and configured to utilize a baffle design which creates turbulent rotational and/or vortex currents to enhance the effective grease and particulate transfer from the hot fumes to the filter.

BACKGROUND OF THE INVENTION

During the operation of commercial or institutional kitchens, a significant amount of valuable thermal energy is lost as a result of hot fumes being vented to the atmosphere. These hot fumes are generated from cook stoves, hot plates, deep fat fryers, and other cooking apparatus. As a result of the extreme heat and various fumes generated during cooking, it is necessary for the comfort and health of kitchen workers to exhaust these fumes on a continuous basis through flue chimneys or similar venting devices. This process effectively replaces the hot kitchen air with cooler, clean outside air. Although this circulation process is necessary to provide a constant source of clean air to the kitchen environment, this venting practice is both inefficient and uneconomical, especially in colder climates where the cost to heat internal air and water is significant.

A further problem encountered in commercial kitchens is the filtering of grease and other particulate matter entrained in the hot fumes generated during the cooking of foods. If improperly filtered, this grease can cause fouling and the eventual malfunction of air ventilation systems, as well as create fire hazards if allowed to accumulate. Accordingly, hot fume air filters, which are normally located in fume hoods over cooking surfaces, are generally required to be cleaned daily, or at a minimum of 2–3 times a week. This tedious cleaning process is both time consuming and expensive.

The use of heat exchangers, to capture thermal energy above cooking surfaces has been known for years. These designs, however, position the heat exchangers substantially downstream of existing grease filters. This approach is unfavorable for at least three reasons. First, these designs are inefficient since the heat exchanger is located downstream of the grease filter and a significant distance from the heat source. Thus, valuable thermal energy is lost by absorption into the grease filter and through general dissipation prior to the heat reaching the exchanger. Second, the grease filters currently being used upstream of the heat exchangers impede air flow, especially when congested with grease, hence reducing the efficiency of the air ventilation system and heat transfer efficiency. Third, when the heat source is turned off, the grease quickly solidifies on the filters and requires cleaning for both safety and efficiency. Finally, despite the existence of these kinds of heat exchangers generally, many existing kitchens fail to incorporate any kind of heat exchanger. Retrofitting existing kitchen equipment with heat exchanger systems may require an entirely new flue hood assembly and substantial piping and accessories. This conversion is both time-consuming and expensive.

Accordingly, it would be advantageous to provide a substantially self cleaning filter which is capable of filtering grease and other particulate matter from hot vapors and fumes generated during the cooking of foods. It would additionally be advantageous to transfer heat from the hot cooking fumes to a fluid passing internally through or substantially adjacent to the filter. This fluid could in turn be used to heat air, water or other fluids for a variety of subsequent uses. By combining the heat exchanger and grease filter into one integral component, the transfer of thermal energy would be more efficient since the heat exchanger is located closer to the heat source. Furthermore, the fluid within the filter would retain heat after the heat source is turned off, allowing the grease to melt and drain away, thus reducing the frequency of cleanings. It would additionally be advantageous to provide a novel baffle design which may be used either independently or in conjunction with the heat exchanger/filter to provide additional filtering of the grease and particulate matter. This baffle design would be significantly more efficient than filters found in the prior art based on the creation of rotational and/or vortex currents as the hot fumes, grease and particulate matter flow through the baffle filter. The combined heat exchanger/filter would further be designed to replace existing grease filters, and thus could be retrofitted easily and at low cost without the need for new flue hood assemblies.

SUMMARY OF THE INVENTION

The proposed combination heat exchanger/filter provides means for both filtering grease and particulate matter entrained in cooking fumes, and capturing thermal energy in a fluid circulated throughout the filter. The fluid can then be utilized to transfer heat to a fluid, e.g., water or air.

In a preferred embodiment, the combination heat exchanger/filter can be advantageously employed designed to replace existing grease filters installed in flue hoods in commercial or institutional kitchens. By utilizing quick release hydraulic couplings, the combination heat exchanger/filter may quickly be assembled to fit existing flue hoods by simply replacing the old grease filter and by supplying fluid access and removal. Thus, significant energy savings can be accomplished by replacing an existing grease filter with a combination heat exchanger/filter, eliminating the need for purchasing an entirely new flue hood assembly. The retrofitting is thus fast, inexpensive, and enhances energy efficiency.

By combining the heat exchanger and air filter, a number of significant advantages are realized. First, the heat transfer efficiency between the heat source and fluid circulated within the filter is improved. This is a result of the close proximity between the heat source and heat exchanger when compared to currently existing systems, where the heat exchanger is located downstream of the grease filter and a significant distance from the heat source. As used herein, "upstream" shall be defined as the side closest to the heat source, e.g., cook stove or hot plate, while "downstream" shall be the side closest to the flue hood chimney. Further, by circulating a cool fluid, such as water in close proximity to the heat source, heat is removed more quickly from the cooking line, thus lowering the surrounding ambient temperature. Additionally, the fluid within the filter can retain heat for a sustained period of time after the heat source is turned off. Thus, by maintaining the fluid temperature at 20°–30° F. above the melting point of grease with a thermocouple or other temperature control device, the grease will continue to melt and self-drain, even after the heat source is turned off. This self-draining reduces the need for frequent cleanings of the grease filter. Further, by combining the filter and heat exchanger, the air flow through the flue hood ventilation system is improved since there is less resistance from grease solidifying on the filter and impeding air flow prior to reaching the heat transfer mechanism.

DETAILED DESCRIPTION OF THE PREFERRED EMBODIMENTS

The subject invention combines a filter used for trapping and collecting grease and other particulates and a heat exchanger capable of capturing thermal energy, such as generated by cooking equipment. This thermal energy is transferred to and stored in a fluid circulated inside the heat exchanger/filter, and is eventually used to provide heat for other purposes, preferably in the kitchen or restaurant environment. By combining the two functions of filtering grease and capturing heat in one integral unit, commercial or institutional kitchen flue hoods may be retrofitted economically by merely replacing existing grease filters with a combined heat exchanger/filter. By combining the grease filter and heat exchanger, a number of additional advantages are realized, such as enhanced heat exchanger efficiency, cooler temperatures on the cooking line for kitchen workers, and the ability of the grease filter to be substantially self-cleaning. Although the present invention is primarily applicable in commercial and institutional kitchen environments, the teachings may be applied to a variety of settings where a heat source generates particulate matter which requires filtering. This may include industrial power plants, laboratories, or refineries, to name a few.

Figure 1:
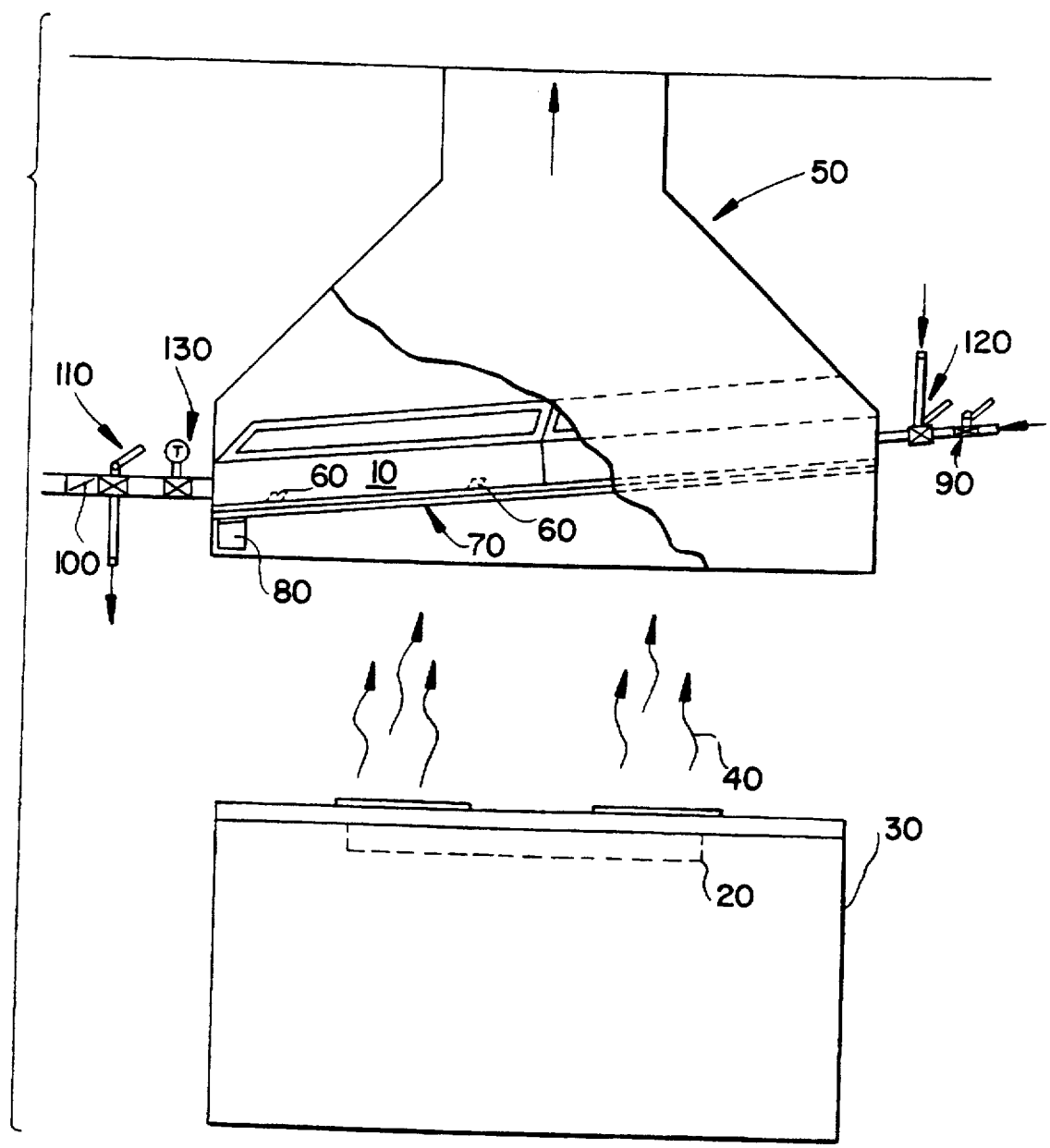
FIG. 1 is a front view of a typical commercial cooking apparatus embodying the features of the invention set forth herein, including a cooking surface and companion flue hood, partially broken away to reveal the combination heat exchanger/filter.

Referring now to the detailed drawings, FIG. 1 depicts a cooking stove and flue hood typically used in commercial or institutional kitchens. A combined heat exchanger/filter 10 is installed where a standard grease filter would normally be in place. Depending on the size of the existing flue hood, a plurality of heat exchanger/filters may be utilized for any variety of dimensions.

As thermal heat energy 20 is generated from a cook stove 30 or other cooking apparatus, hot grease, food particles, and other particulate matter 40 mix with hot air and are directed into a flue hood 50. The flue hood 50 captures and directs the hot gas, grease, and other particulate matter 40 through the filter 10, eventually venting hot fumes outside the kitchen environment. The ventilation of hot fumes from the kitchen environment serves a dual purpose. First, by replacing hot, contaminated inside air with cool, clean, outside air, a more comfortable working environment is created for kitchen employees. Second, by removing highly flammable grease from the immediate cooking area, the fire danger resulting from grease accumulation is reduced.

Figure 2:
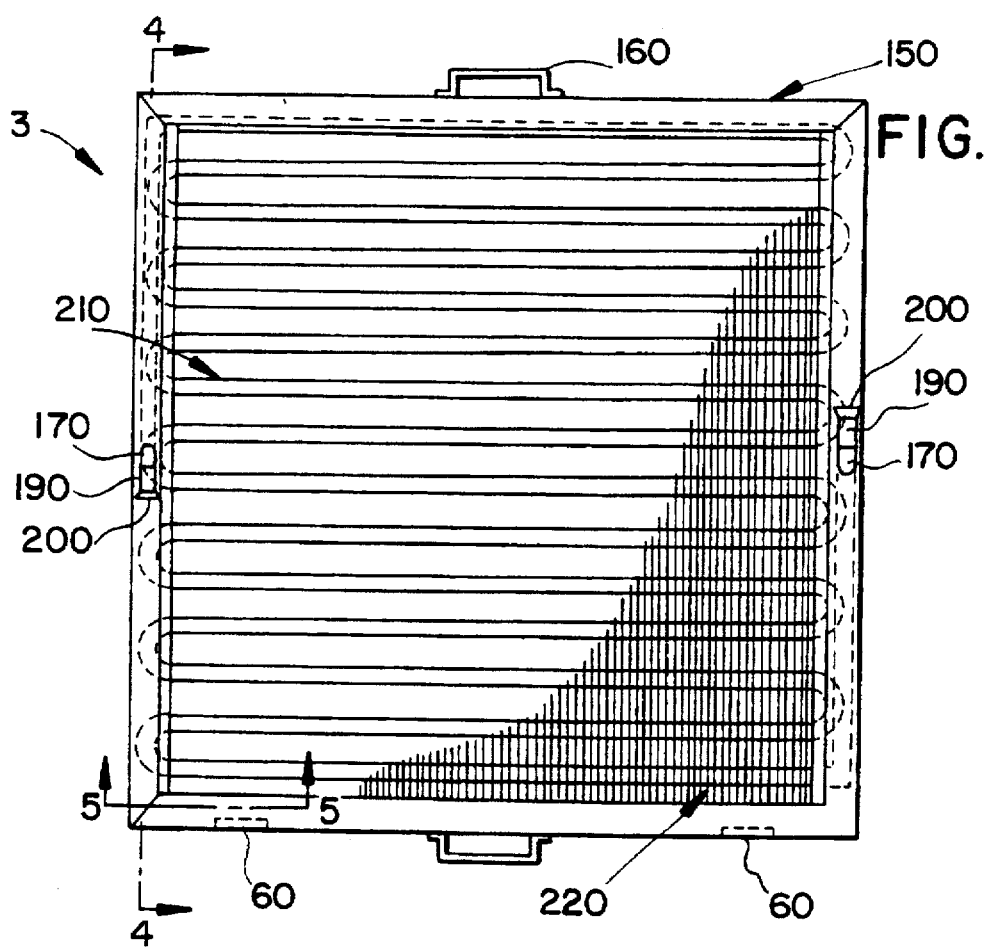
FIG. 2 is a plan view of a combination heat exchanger/filter with the fins partially cut away.
Figure 4:
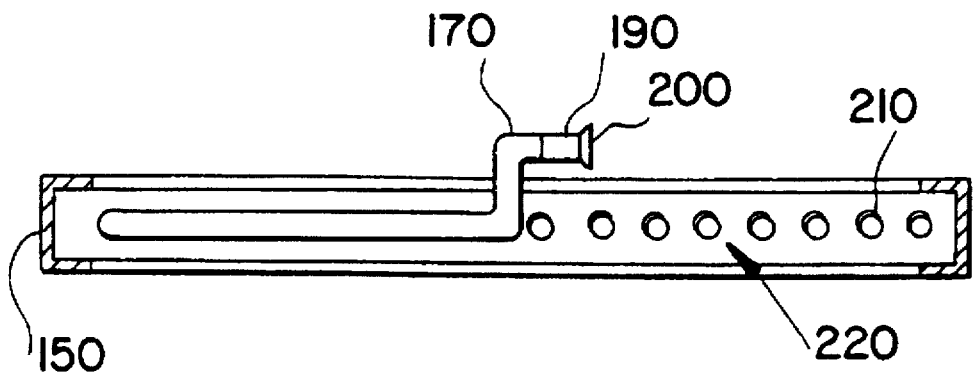
FIG. 4 is a cutaway cross-sectional view taken along line 4—4 of FIG. 2.
Figure 5:
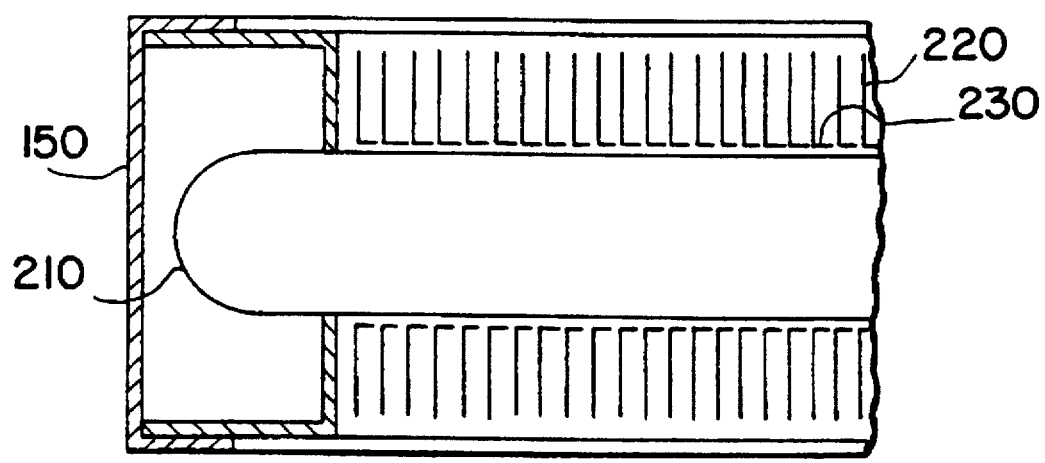
FIG. 5 is a cutaway cross-sectional view taken along line 5—5 of FIG. 2.

As grease and other particulate matter 40 generated during cooking are carried upward into the flue hood 50, these particles impinge on and are captured by the vanes of the heat exchanger/filter 10. Although the heat exchanger/filter 10 unit can be oriented at almost every conceivable angle within the flue hood 50, preferably the vanes have a minimum angle sufficient to allow the liquid grease and particulate matter to gravity drain into a grease collection tray 70. The liquid grease and particulate matter then drain into a removable storage container 80 for disposal, as depicted in FIG. 1. This grease and particulate matter filtering and collection process prevents the grease and particulate matter from collecting and impeding air flow in the flue hood, which often contains a fan to improve the rate of ventilation. Although heat exchanging vanes are depicted in FIGS. 2, 4 and 5, any type of fin, vane or other heat conducting configuration known by one skilled in the art is suitable for transferring heat to the fluid contained within the heat exchanger/filter 10.

In a preferred embodiment of the present invention a baffle 240 may be installed adjacent to the heat exchanger/filter 10 or within the frame housing 150 of the heat exchanger/filter 10. Preferably, the baffle is located immediately upstream of the conduit 210 and heat exchanging fins 220 attached to the conduit 210. As used herein, "upstream" shall be defined as the side closest to the heat source, e.g., cook stove or hot plate, while "downstream" shall be the side closest to the flue hood chimney.

The baffle comprises a series of upstream vanes 242 and downstream vanes 244 oriented in a geometric configuration which creates a tortuous flow path for the upwardly rising hot fumes, grease and particulate matter. This tortuous flow path creates turbulence in the vapor stream flowing through the baffle, as well as generate both rotational and vortex flow patterns within the vanes of the baffle. While not wishing to be bound by any theory, it is believed that this flow path creates forces which increase the amount of grease and particulate matter collected on the baffle. More specifically, the upstream vanes 242 and downstream vanes 244 are geometrically arranged to create rotational and vortex currents between the inlet port 246 on the upstream side and the outlet port 248 on the downstream side of the baffle. It is believed that the rotational and vortex flow patterns allow the grease and other particulate matter entrained in the hot fumes to collide with fumes, grease and particulate matter entering adjacent inlet ports. Furthermore, the rotational and vortex flow patterns utilize centrifugal force to drive the grease and particulate matter against the baffle vanes. The result is a more effective transfer of grease and particulate matter from the fumes to the upstream and downstream vanes. Subsequently, the grease and particulate matter is preferably gravity drained to a removable grease container 80.

While not wishing to be bound by any theory as to the precise manner in which the improved baffle design filter of the present invention more efficiently transfers grease and particulate matter from the fumes to the filter, it is believed that the increased efficiency is a result of the flow patterns induced upon the hot fumes by the baffle design. In particular, Applicant believes that the minimum of two abrupt changes in angle between the upstream entry port 246 and downstream exit port 248 create rotational and/or vortex flow patterns. Preferably, these changes in angle are a minimum of at least about 25 degrees. More preferably, the entry and exit ports defined by the upstream vanes 242 and downstream vanes 244 are oriented whereby the entry port 246 is directed downward towards the upturned downstream vane 244 at an angle of at least about 30 degrees from the horizontal plane defined by the upstream vanes. Similarly, the exit port 248 is directed upward toward the upstream vane 242 at an angle of at least about 30 degrees from the horizontal plane defined by the downstream vanes. Most preferably the entry ports 246 are directed downward at an angle of about 45 degrees from horizontal and the exit port directed upward at an angle of about 45 degrees from the horizontal planes defined above. The resultant effect is the entry ports are directed at about a 90 degree right angle towards the upturned downstream vanes 244. It is believed that the abrupt changes in flow path caused by the orientation of the upstream vanes 242 and downstream vanes 244 creates significant turbulence and the resultant rotation and vortex flow of the fumes, grease and particulate matter. Preferably, the hot fumes, grease and particulate matter change direction a minimum of 30 degrees at least two times between the inlet and exit ports. More preferably the fumes, grease and particulate matter change direction a minimum of 40 degrees at least two times between the inlet and exit ports.

While a portion of the flow travels in a vortex pattern and eventually through the outlet port to the immediate left of the entry port 246, it is believed that another portion of flow rotates to the right and out an adjacent outlet port to the right of the entry port. The rotational flow to the right additionally collides with fumes travelling from an adjacent entry port 246 to the immediate right. This mixing of flow regimes is also believed to enhance the filtering process as a result of collisions between grease and particulate solids. As the grease and particulate matter rotate and flow through the series of turns, the grease and particulate matter attach to the vanes in a highly efficient filtering process. Any remaining grease and particulate matter travels downstream to impinge on the heat exchanging vanes in contact with the continuous conduit 210 when the baffle 240 is used in conjunction with the heat exchanger/filter 10 unit. To ease cleaning, the baffle 240 may be removed independently of the heat exchanger/filter 10.

The baffle may be used independently of the heat exchanger/filter 10 as an efficient grease filter when heat transfer requirements are unnecessary. The baffle used independently of the heat exchanger has been found to be extremely efficient as a result of the baffle design. In grease loading tests conducted for an independent testing service, a ratio of 4 times the weight of grease retained on the filter must be trapped and collected in a storage container to receive a passing score. These tests are conducted by measuring the dry weight of the filter before inducing grease laden fumes through the filter. After a predetermined time period the fume source is turned off and the mass of grease collected in an adjacent storage container is measured, as is the weight of the filter. The weight of the grease collected in the adjacent container is then divided by the weight of the grease retained on the filter. The ratio achieved by a grease filter in accordance with the present invention utilizing the unique baffle design achieved a ratio of 17.5:1 as tested by the independent testing service. The test data obtained during one of the aforementioned tests may be seen in TABLE 1 and is provided for the purpose of illustration and is not intended to limit the scope of the invention.

TABLE 1

|  | WEIGHT BEFORE TEST, GRAMS | WEIGHT AFTER TEST | WEIGHT OF GREASE COLLECTED | COMBINED RATIO |
| --- | --- | --- | --- | --- |
| Filter 1 | 7611 | 7614 | 3 |  |
| Filter 2 | 7652 | 7672 | 20 |  |
| Collection Cup | 597 | 1000 | 403 | 17.5 |

As the grease and other fine particulate matter collects on the baffle 240 and/or heat exchanger/filter 10, these particles eventually gravity feed to the lower end of the heat exchanger/filter, which is installed at a slight angle. The grease and other particulate matter then drains through an opening or weephole 60 into a grease collection tray 70, and eventually feeds into a removable storage container 80 for disposal. In a preferred embodiment, a mason jar or other clear, non melting, nonflammable container is used which readily indicates when the container needs to be emptied or discarded.

In keeping with the principles of the present invention, the heat exchanger/filter 10 contains a fluid, which is circulated inside the device. This fluid may be water, air or any other suitable fluid depending on what type of secondary heating needs exist in the commercial or institutional kitchen setting. In a preferred embodiment, water is introduced into the heat exchanger/filter 10, heated to a predetermined temperature, and then discharged to a hot water boiler for use in other applications such as washing dishes or hot water heat. In a further embodiment, water additives including but not limited to ethylene glycol may be added to the fluid to improve the heat transfer efficiency of the fluid. This fluid may then be circulated in pipes, a radiator, or other devices known in the art to transmit heat to fluids such as water or ambient air.

The fluid entering the heat exchanger/filter 10 may be turned off with an upstream valve 90, allowing the unit to be operated without the heat exchanging capability and solely as a filter. Further, a valve is useful during the installation, removal, or cleaning of the heat exchanger/filter 10. A ball valve, plug valve, butterfly valve or other type of valve commonly known by those skilled in the art can be used for this purpose. In a preferred embodiment, a low pressure ball valve with a teflon seat is used which may easily be identified by kitchen workers as being either open or closed.

In a like manner, downstream of the heat exchanger/filter 10 a flow control valve 100 can be installed to prevent fluid from backflowing into the flue hood 50 during the installation, removal, or cleaning of the heat exchanger/filter 10. In a preferred embodiment of the present invention, a check valve is installed which only allows fluid to flow in a downstream direction from the heat exchanger/filter 10.

Moreover, to prevent air from entering into and possibly contaminating the fluid circulating inside the heat exchanger/filter 10 and piping system, a bleed valve 110 can be installed downstream of the heat exchanger/filter 10. As heat exchanger/filters 10 are installed, they are initially void of any water and contain only air. To purge air from entering the closed system, the bleed valve 110 is opened until fluid is discharged, indicating that the heat exchanger/filter 10 has been purged. In a preferred embodiment, a low pressure ball valve, plug valve, butterfly valve or other similar valve known in the art may be used to bleed air from the closed system.

In a like manner, to purge the heat exchanger/filter 10 of fluid prior to removal for cleaning or other purposes, an air intake valve 120 may be installed immediately upstream of the heat exchanger/filter 10 to allow the introduction of air and remove all fluids. As a consequence, the weight of the heat exchanger/filter 10 is reduced significantly, thus easing removal for kitchen workers. As appreciated by those skilled in the art, this air purge valve may be a ball valve or other suitable valve.

In accordance with one of the features of the present invention, the rate of fluid flowing through the heat exchanger/filter 10 is controlled by a temperature sensing device 130 which monitors the temperature of the fluid inside the heat exchanger/filter 10. As the temperature reaches a predetermined level, the temperature sensing device sends a signal to a variable orifice valve 140 which opens downstream of the heat exchanger/filter 10, allowing the discharge of fluid. In a preferred embodiment of the current invention, a thermocoupling or other device known in the industry may be used to monitor the temperature of fluid. Variable orifice valves or other similar devices can be used which automatically open and close based on the temperature of the fluid as monitored by the temperature sensing device.

The circulation of fluid inside the heat exchanger/filter 10 serves a plurality functions. First, the circulating fluid is located close to the thermal energy heat source 20, improving the efficiency of the system since the fluid is heated at a faster rate as compared to heat exchangers located a greater distance downstream in the flue hood 50. In a preferred embodiment, water within the heat exchanger/filter 10 can be heated to a minimum of 80° F. above the entry water temperature at a rate of at least about 4 gallons/min.

Second, by circulating cool fluid into the heat exchanger/filter 10 at a location immediately above the cooking surface, heat is transferred more rapidly into the fluid and the ambient temperature at the cooking line in the kitchen environment is maintained at a lower level. Furthermore, as cool fluid is initially introduced into the heat exchanger/filter 10, grease and other particulate matter collects more quickly, hence improving the filtering capability of the system.

Finally, by controlling the temperature of the fluid inside the heat exchanger/filter 10, heat mass can be stored after the heat source 20, e.g. cook stove or hot plate, is turned off. This allows grease to continue to melt and drain even after the heat source 20 is turned off and no longer generating hot fumes, grease and particulate matter 40. The filter is thus substantially self-cleaning. In a preferred embodiment of the present invention, the temperature of the fluid inside the heat exchanger/filter 10 is maintained at least about 25° F. above the melting point of grease during operation of the system, or at least about 150° F.

To assure that the heat exchanger/filter 10 is operated safely, and to ease cleaning, a pressure relief valve 260 may be installed within the frame of the heat exchanger/filter 10 or in any other suitable location on the heat exchanger/filter 10 unit. The pressure relief valve 260 is continuously in communication with the fluid circulating within the continuous conduit 210. As the temperature of the fluid increases, the pressure rises accordingly inside the continuous conduit 210. Excessive pressure may burst the continuous conduit 210, couplings 200 or other components of the system, either during normal operation or during cleaning in high temperature dishwashers or other apparatus. By utilizing a pressure relief valve with a pressure actuation setting below the burst pressure of the internal components of the heat exchanger/filter 10, excessive pressure may be relieved, thus creating a safety system not requiring human intervention to manually relieve excessive pressure. In a preferred embodiment of the present invention the pressure relief valve 260 is installed within the frame housing 150 whereby any discharge is confined within the frame to prevent kitchen workers from being burned or venting over food surfaces. In a more preferred embodiment of the present invention the pressure relief valve 260 is set to relieve pressure at about 150 psig.

FIG. 2 illustrates the plan view of a heat exchanger/filter 10. A frame housing 150 with handles 160 supports an entry communication port 170, exit communication port 180, attachment hose 190, coupling device 200, and conduit 210 for transferring a fluid between said ports and heat exchanging fins 220.

The frame housing 150 provides support for the components of the heat exchanger/filter 10 and handles 160 for carrying and transporting the filter in a convenient manner. The dimensions of the frame are specifically designed to permit the retrofitting of existing flue hoods in commercial or institutional kitchens by replacing existing grease filters with heat exchanger/filters. Depending on the size of the existing flue hoods, frame housings 150 may be placed side by side and/or in series to obtain the desired dimensions. In the present form of the invention, the frame housing 150 is constructed of a durable, non flammable material. In a preferred embodiment, the frame housing 150 is constructed of galvanized steel. Weepholes 60 are provided in the bottom of the frame housing 150 to drain grease and other particulate matter from the heat exchanger/filter 10. The grease and other particulate matter may then drain inside the flue hood grease containment tray 70 to a removable grease container 80.

In accordance with one of the principle objects of the invention, means are provided for a fluid to enter and exit the heat exchanger/filter through an entry communication port 170 and an exit communication port 180 which extends through the frame housing 150. In a preferred embodiment of the present invention, these communication ports are oriented on opposite ends of the frame housing 150 and are constructed of copper pipe which extends from the conduit located inside the frame housing 150 to the exterior of the frame housing 150. The entry communication port 170 or exit communication port 180 may then be attached to a flexible hose 190 connected to a coupling device 200. In a preferred embodiment of the present invention a heat resistant, flexible teflon hose is used to connect the entry and/or exit communication ports to the coupling devices 200. However, as appreciated by those skilled in the art, any type of ductile, non-flammable material, including metallic materials may be used as a flexible hose. By utilizing flexible hose 190 and couplings 200 to attach adjacent heat exchanger/filters 10, kitchen workers can visually see the coupling device and are not required to align rigid coupling devices underneath the flue hood 50.

The coupling device 200 serves the dual function of attaching two or more heat exchanger/filters 10 together and additionally providing an airtight seal when the heat exchanger/filters 10 are removed for cleaning or other purposes. This assures that potable water or other fluids used within the system are not contaminated during the installation or cleaning of the heat exchanger/filters 10. In a preferred embodiment, a ½ diameter coupling valve 200 is used with either a male or female end attached to either entry or exit communication ports or flexible hose 190 on adjacent heat exchanger/filters 10. This allows the coupling valves 200 to quickly be snapped together or apart for installation or removal of the heat exchanger/filter 10.

The entry communication port 170 and exit communication ports 180 are connected to a continuous conduit 210 located within the internal perimeter of the frame housing 150. The continuous conduit transports fluid from the communication ports, accepting cool fluid from the entry communication port 170 and discharging warm fluid from the exit communication port 180. The fluid is heated as hot fumes, grease, and other particulate matter passes over and around the continuous conduit. In a preferred embodiment of the present invention, a continuous conduit 210 with a high heat exchanging capacity is used to transfer the maximum amount of heat from the thermal energy source to fluid circulating inside the conduit 210. In a more preferred embodiment of the present invention, a conduit configuration which provides the maximum amount of conduit surface area is used. FIG. 2 discloses an embodiment in which one end of ½ copper pipe is connected to the entry communication port 170 and is bent to form a series of serpentine loops within a horizontal plane. The other end of the copper pipe is connected to the exit communication port 180.

In a preferred embodiment, attached to the continuous conduit 210 are a series of vanes or fins 220. These fins or vanes 220 serve the dual purpose of transferring heat from the hot fumes to the fluid within the continuous conduit, and to additionally trap grease and other particulate matter entrained in the fumes. This filtering mechanism prevents grease and other particulate matter from accumulating in the flue hood 50, which can create a fire hazard or impede ventilation. In a preferred embodiment of the current invention, the fins 220 are comprised of thin, heat conductive metal material which can withstand high temperatures without deforming or becoming brittle. In the embodiment of FIGS. 2 and 5, the fins 220 are made of aluminum with a thickness no greater than about ¹⁄₁₆th of an inch, a maximum distance between fins of no greater than about ⅛th of an inch, and a depth of no less than ½" extending on both the upper and lower side of the continuous conduit. As can be appreciated by those skilled in the art, there are a variety of materials and configurations which can be used for heat exchanging fins.

Figure 3:
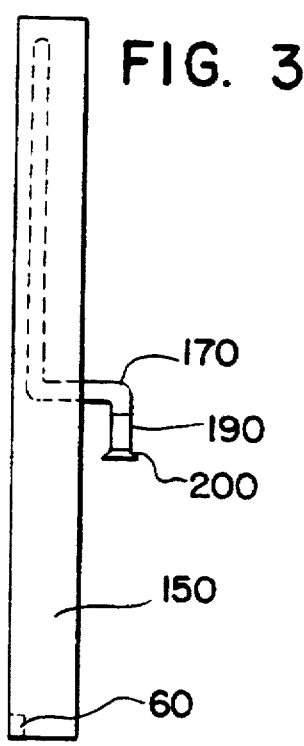
FIG. 3 is a left side view of the combination heat exchanger/filter taken along line 3—3 of FIG. 2.

Turning now to a left side view of the current invention, FIG. 3 illustrates a view of the heat exchanger/filter 10 taken from line 3—3 as depicted in FIG. 2. As hereinbefore set forth, a communication port 170 (either entry or exit) is attached to the continuous conduit 210 and is extended outward and perpendicular to the frame housing 150. The communication port may then be attached to either a flexible or semi-rigid hose 190 or directly to a coupling 200 if a flexible hose 190 is attached to the corresponding port on an adjacent heat exchanger/filter 10.

The coupling device 200 will be fitted with either a male or female connecting device, or any other device known in the art which may quickly be connected and disconnected yet provide an airtight seal. The proper sealing is critical to prevent the contamination or leakage of potable water or other fluids which are being circulated within the heat exchanger/filter 10. The coupling device must further be capable of operating at high temperatures over long periods of time without deforming or malfunction. In a preferred embodiment of the current invention a coupling device 200 is used to connect a plurality of heat exchanger/filters 10 in series. A person of skill in the art will recognize that various types of coupling devices are available, and that the coupling device may be recessed within the frame housing 150 or may be external as shown in FIGS. 2 and 3.

FIG. 4 illustrates an isolated and expanded cutaway sectional view of line 4—4 as depicted in FIG. 2. This drawing depicts the serpentine continuous conduit 210 and attachment of the heat exchanging fins 220. As seen, the continuous conduit 210 is spaced in a manner which optimizes the heat exchanging capacity by exposing the maximum surface area of the continuous conduit 210 to hot fumes. In a preferred embodiment the continuous conduit 210 is aligned in a horizontal plane with heat exchanging fins 220 extending perpendicular to the continuous conduit 210, although any potential combination of fins and continuous conduit 210 may be used as appreciated by one skilled in the art. The heat exchanger/filter 10 is oriented in a plane which is essentially perpendicular to the flow of hot rising fumes, grease and particulate matter. A sufficient angle is provided, however, to allow the grease and particulate matter to drain into the grease containment tray 70 and eventually collected in a removable grease container 80. However, as appreciated by one skilled in the art, the heat exchanger/filter 10 may be oriented in any number of variations which would optimize both the heat exchanging and filtering capacity of the heat exchanger/filter 10. Furthermore, the diameter of the continuous conduit 210 will depend on the specific components of the application, including heat source available, volume of water required for circulation, inlet and exit temperature differential, etc. In a more preferred embodiment in a commercial or institutional kitchen, the continuous conduit is comprised of ½ copper piping.

Turning now to FIG. 5, a cross-sectional view of the heat exchanging fins 220 can be seen from line 5—5 in FIG. 2. The fins are oriented in a manner which enhances both the transferring of heat from the hot fumes generated from the thermal energy source and trapping grease and other particulate matter entrained in the fumes. There are a variety of shapes, materials and orientations which may be utilized to achieve this purpose. Although the heat exchanging fins may be permanently attached to the continuous conduit 210, in a preferred embodiment of the current invention the fins slide over the continuous conduit 210 and are separated by a fin collar 230. This embodiment prevents the fins 220 from touching and hence maximizes the heat exchanging capacity of the heat exchanger/filter 10. In a more preferred embodiment of the present invention, at least about ⅛ separates the centerline between two adjacent heat exchanging fins 220.

Figure 6:
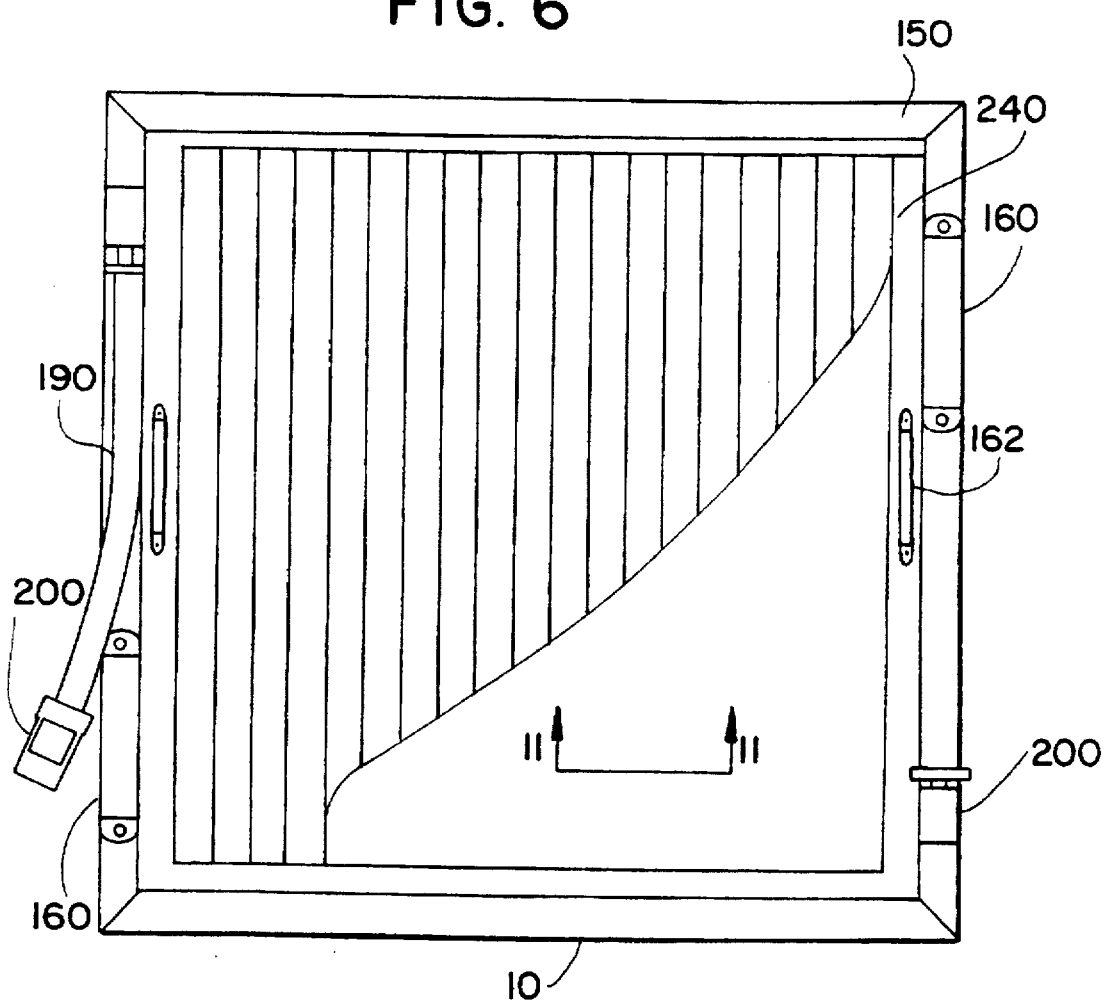
FIG. 6 is a plan view of the combination heat exchanger/filter with baffle installed within the framework.

FIG. 6 illustrates a plan view of the heat exchanger/filter 10 in combination with the recessed baffle 240. In a preferred embodiment the baffle 240 is recessed within the frame housing 150 and immediately upstream from the continuous conduit 210 and heat exchanging fins 220. Furthermore, both the heat exchanger/filter 10 and baffle 240 may have handles 160 and 162 to ease installation and removal from the flue hood for cleaning or servicing.

Figure 7:
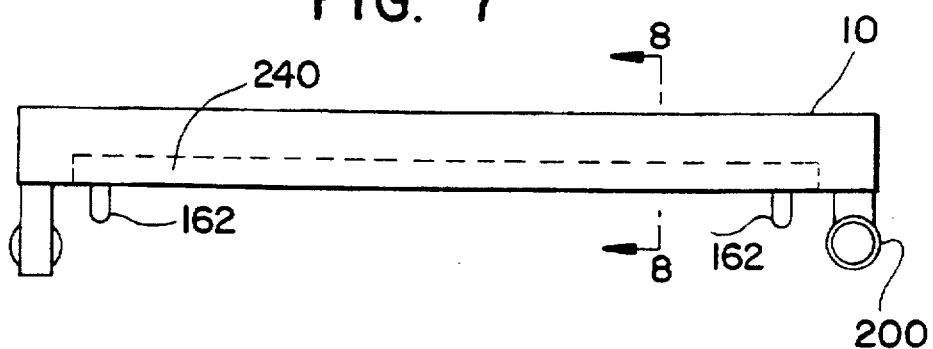
FIG. 7 is a top view of a combination heat exchanger/filter illustrating the recessed baffle.

Turning now to the top view of the heat exchanger/filter 10, FIG. 7 shows a preferred location of the recessed baffle 240. The baffle 240 fits flush behind the heat exchanger/filter frame housing 150, and can be removed to allow the heat exchanger/filter 10 to operate independently of the baffle. Likewise, the baffle can be used independently of the heat exchanger/filter 10 if a need does not exist to heat water or other fluids.

Figure 8:
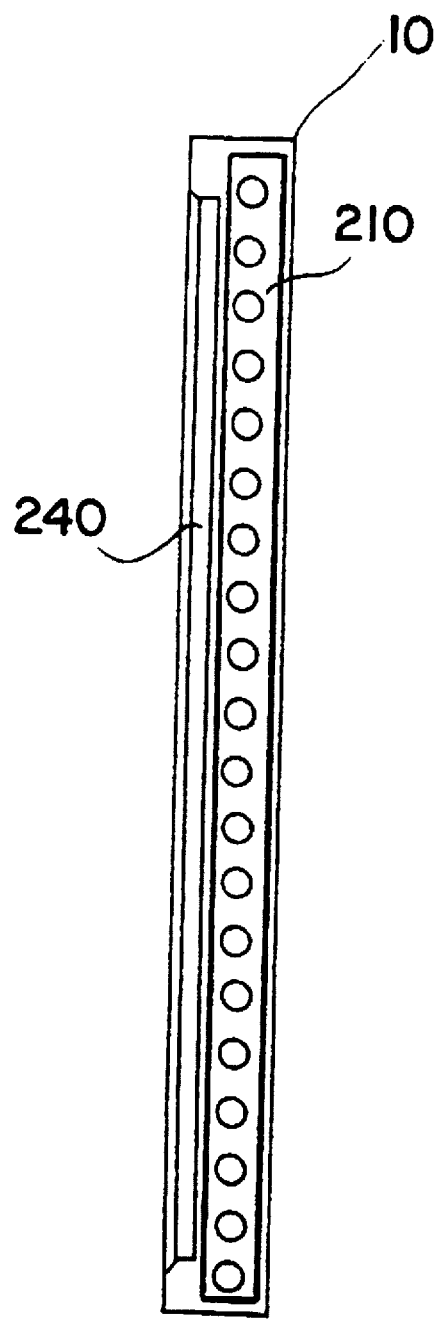
FIG. 8 is a cutaway cross sectional view taken along line 8—8 of FIG. 7.

FIG. 8 is a cutaway cross sectional view taken from line 8—8 on FIG. 7. This Figure depicts a location of the baffle 240 immediately upstream from the continuous conduit 210 and in relation to the frame housing 10.

Figure 9:
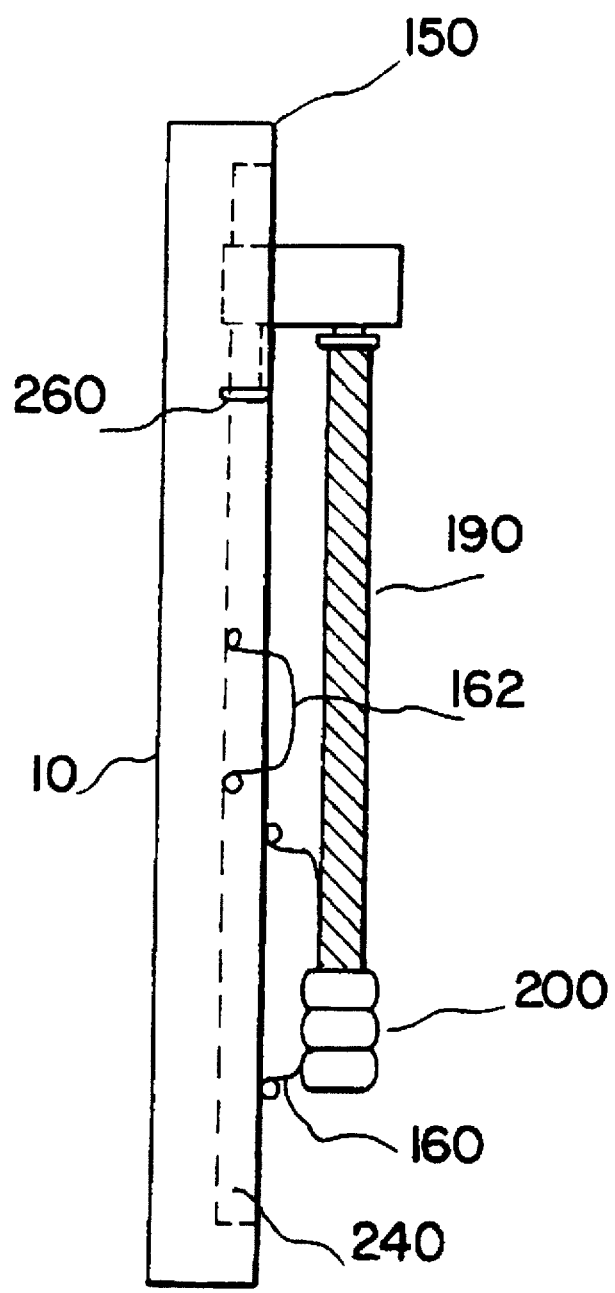
FIG. 9 is a right side view of the combination heat exchanger/filter and recessed baffle.

FIG. 9 is a left side view depicting the frame housing 150 and components of the heat exchanger/filter 10, including flexible attachment hose 190, coupling 200, recessed baffle 240 and pressure relief valve 260. In a preferred embodiment the pressure relief valve is located within the frame housing 150 to prevent any damage due to inadvertent contact during removal or cleaning of the heat exchanger/filter 10.

Figure 10:
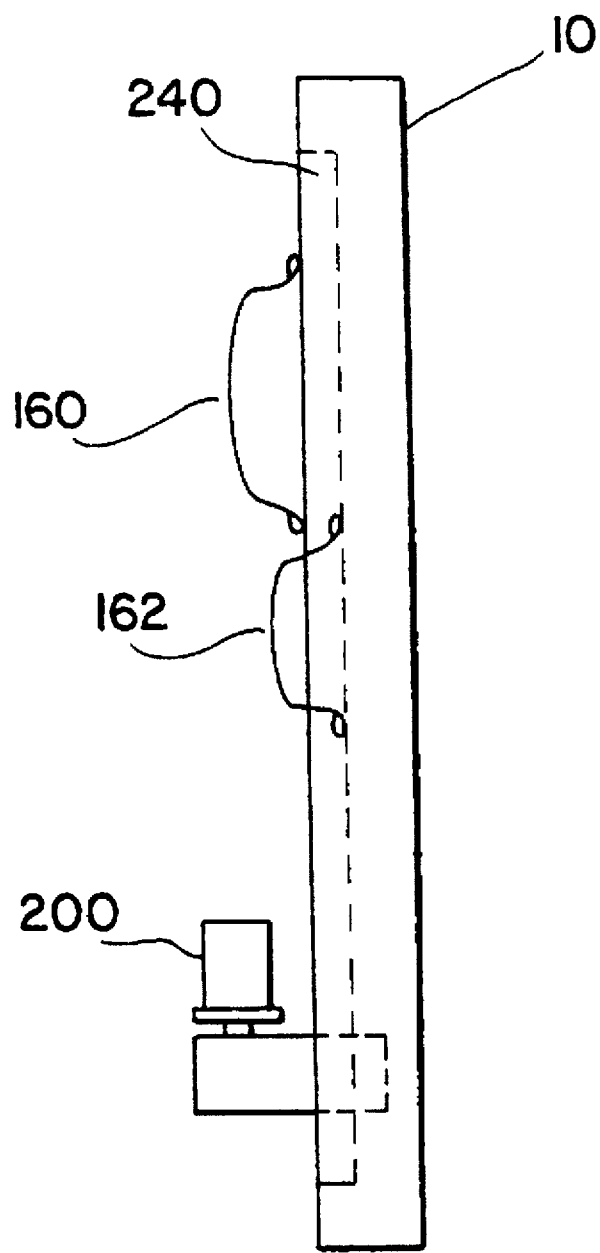
FIG. 10 is a left side view of the combination heat exchanger/filter and recessed baffle.

Turning now to a left side view of the heat exchanger/filter 10, FIG. 10 depicts the location of the recessed baffle 240 and location of heat exchanger/filter handle 160 and baffle handle 162. Furthermore, the female end of the coupling 200 is depicted, although the exact location of the coupling is not critical as long as the male coupling from an adjacent filter can be readily attached.

Figure 11:
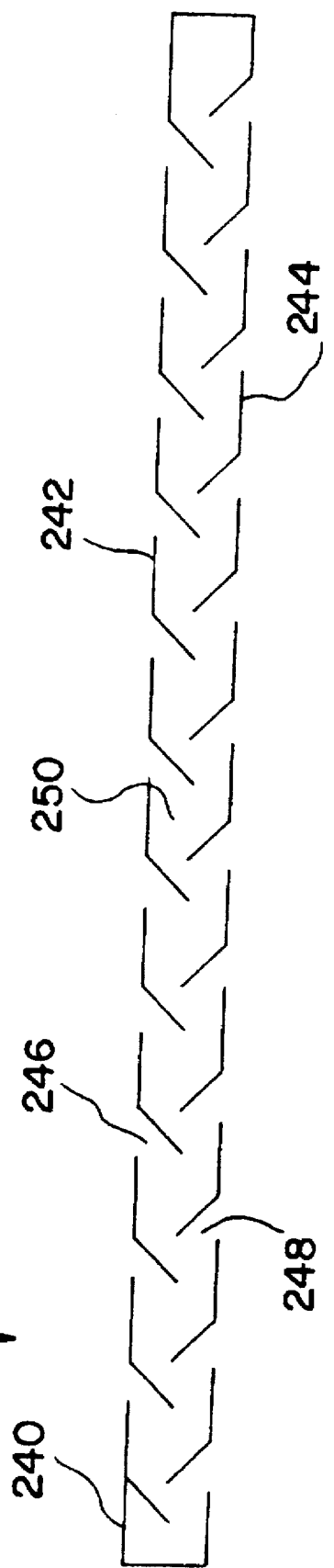
FIG. 11 is a cutaway cross-sectional view of the baffle taken along line 11—11 of FIG. 6.

FIG. 11 is a cut away cross-sectional view of the baffle 240 along line 11—11 as seen in FIG. 6. This view depicts the upstream vanes 242, downstream vanes 244, entry port 246, exit port 248, and internal chamber 250. During operation of the baffle, hot cooking fumes, grease, and particulate matter enter into one of a plurality of entry ports 246 and subsequently into one of the numerous chambers 250 defined by the upstream vanes 242 and downstream vanes 244. The geometric configuration of the upstream vanes 242 and downstream vanes 244 create turbulence within the chamber which results in rotational flow and/or a vortex. This spinning flow pattern throws the converging grease and particulate matter against the upstream vanes 242 and downstream vanes 244 to effectively remove a significant portion of the grease and particulate matter from the hot fumes rising through the filter.

While various embodiments of the present invention have been described in detail, it is apparent that modifications and adaptations of those embodiments will occur to those skilled in the art. It is to be expressly understood, however, that such modifications and adaptations are within the scope of the present invention, as set forth in the following claims.

What is claimed is:

1. A device for heating fluid and filtering grease and particulate matter said device comprising:
    (a) means for exchanging heat including a conduit capable of carrying a fluid therethrough, said conduit oriented such that hot fumes pass over said conduit and transfers heat to said fluid; and
    (b) means for filtering wherein said conduit and a plurality of fins are configured such that at least some of said grease and said particulate matter attach to said means for filtering.

2. The device of claim 1, wherein said hot fumes, said grease and said particulate matter are generated from a cooking appliance used in a kitchen environment.

3. The heat exchanger/filter of claim 1, further comprising fluid control means to control the release of fluid from inside said conduit and temperature control means to monitor the temperature of said fluid wherein said fluid control means and temperature control means work in association to maintain the temperature of said heat exchanger/filter at least above the melting temperature of grease.

4. The heat exchanger/filter of claim 3, wherein said fluid control means comprises a variable orifice valve to regulate the rate of said fluid entering and exiting from said heat exchanger/filter.

5. The heat exchanger/filter of claim 1, further comprising a removable container positioned adjacent to said heat exchanger/filter, wherein said removable container is oriented to substantially collect said particulate matter and said grease filtered by said heat exchanger/filter.

6. The heat exchanger/filter of claim 1, further comprising coupling means to provide fluid communication between multiple heat exchanger/filters.

7. The heat exchanger/filter of claim 1, wherein said fluid medium is water.

8. The heat exchanger/filter of claim 1, wherein said fluid medium comprises a mixture of water and ethylene glycol.

9. The heat exchanger/filter of claim 1, wherein said filtering means further comprises a baffle substantially adjacent to said conduit, said baffle configured to create vortex currents of said fumes, grease and particulate.

10. The heat exchanger/filter of claim 1, further comprising pressure control means to prevent excessive conduit fluid pressure.

11. The heat exchanger/filter of claim 10, wherein said pressure control means comprises a pressure relief valve in communication with said conduit fluid to relieve fluid pressure at a predetermined pressure.

12. A fluid heater and grease filter system for use in a kitchen environment, the environment including a heat generating cooking appliance for preparing cooked foods and which also generates airborne grease, fumes, and particulate matter as a result of the cooking process, the system comprising:
    (a) heat exchanging means, including a conduit capable of carrying fluid therethrough, said conduit oriented such that the heat generated from the cooking equipment passes over said conduit and transfers heat to said fluid;
    (b) said conduit further defining a filter means wherein said conduit and a plurality of fins are configured such that at least some of the grease and particulate matter are removed from the fumes generated from the cooking appliance and attach to said filter means;
    (c) fluid control means, wherein the rate of said fluid entering and exiting said combination heat exchanger/filter is regulated by the monitoring of the temperature of said fluid inside said conduit;
    (d) collection means disposed adjacent said filter means to collect the grease and particulate which attaches to said filter means.

13. The combination heat exchanger/filter of claim 12, further comprising coupling means to provide fluid communication between multiple heat exchanger/filters.

14. The combination heat exchanger/filter of claim 12 wherein said fluid inside said conduit is maintained at an operating temperature at least above the melting point of grease.

15. The heat exchanger/filter of claim 12, wherein said filtering means further comprises a baffle substantially adjacent to said conduit, said baffle configured to create rotational and vortex currents of said fumes, grease, and particulate matter.

16. The combination heat exchanger/filter of claim 12, further comprising pressure control means to prevent excessive internal fluid pressure in said heat exchanger/filter conduit.

17. A system for filtering particulate matter and grease from hot fumes and heating a fluid circulating through the system, comprising:
   (a) a conduit capable of carrying a fluid therethrough, said conduit oriented such that the hot fumes pass thereover, transferring heat to said circulating fluid;
   (b) said conduit and an attached plurality of fins further being oriented to define a filter means such that at least some of the particulate matter and grease from the hot fumes are collected on said conduit and said attached plurality of fins;
   (c) fluid control means, wherein the rate of said fluid entering and exiting said system is regulated by the monitoring of the temperature of said fluid inside said conduit.

18. The system of claim 17, further comprising pressure control means to prevent excessive fluid pressure inside said conduit.

19. The system of claim 17, further comprising an upstream baffle to enhance filtering of said particulate matter and grease, said baffle configured to create a vortex flow pattern.

20. A method for filtering grease and particulate matter from airborne fumes and utilizing heat released from cooking equipment to heat incoming fluid, comprising:
   (a) circulating said fluid into a conduit;
   (b) passing said air fumes from said cooking equipment over said conduit;
   (c) transferring heat from said airborne fumes to said fluid contained in said conduit;
   (d) discharging heated fluid from said conduit;
   (e) trapping said grease and said particulate matter on said conduit and a plurality of fins in close proximity to said conduit; and
   (f) collecting said grease and said particulate matter in a removable vessel.

21. The method of claim 20, further comprising temperature control means to maintain the temperature of said fluid within said conduit above the melting point of grease.

22. The method of claim 20, further comprising rate control means to control the rate of said fluid entering and exiting said conduit.

23. The method of claim 20, further comprising pressure control means to monitor and control the fluid pressure within said conduit to maintain said fluid pressure below a predetermined level.

24. The method of claim 20, further comprising rotating said airborne fumes, grease and particulate matter in a circular flow pattern inside a substantially adjacent baffle to enhance trapping of said grease and particulate matter.

25. A combination heat exchanger/filter for use in a kitchen environment, said environment including a heat generating cooking appliance for preparing cooked foods and which also generates grease, fumes and particulate matter as a result of the cooking process, the combination comprising:
   (a) a rectangular body;
   (b) said body including first and second fluid communication ports and a serpentine continuous conduit disposed between and interconnecting said ports; said first port adapted to receive fluid from a fluid source and said second port adapted to transmit fluid from said combination heat exchanger/filter;
   (c) a plurality of thin fins extending from said conduit and oriented to absorb heat and collect grease and other particulate matter;
   (d) control means, comprising a temperature sensing device and fluid flow regulation device for controlling the discharge of fluid from said conduit and maintaining the temperature of said fluid in said conduit above a predetermined value;
   (e) a pressure relief valve in communication with said continuous conduit fluid, said pressure relief valve discharging fluid from said continuous conduit when the fluid pressure rises above a predetermined level; and
   (f) an upstream baffle located substantially adjacent said plurality of thin fins extending from said conduit, said baffle having a plurality of entry ports and a plurality of exit ports defined by a plurality of upstream vanes and plurality of downstream vanes, said vanes configured to create rotational and circular flow patterns of said fumes, grease and particulate matter between said plurality of entry ports and said plurality of exit ports, whereby at least some of said grease and particulate matter temporarily attach to said upstream and said downstream vanes.

26. The heat exchanger/filter of claim 25, wherein the temperature of said fluid is maintained at least about 25° F. above the melting point of grease.

27. The heat exchanger/filter of claim 25, further comprising a removable collection container positioned adjacent to said heat exchanger/filter, wherein said heat exchanger/filter is oriented to collect said particulate matter and said grease in said removable collection container.

28. The heat exchanger/filter of claim 25, further comprising attachment means for attaching said heat exchanger/filter to a hood, said hood used to capture and direct said grease, fumes and particulate matter away from said cooking equipment heat source.

29. The heat exchanger/filter of claim 25, further comprising coupling means to provide fluid communication between multiple heat exchanger/filters.

30. The heat exchanger/filter of claim 25, wherein said fluid medium is water.

31. The heat exchanger/filter of claim 25, wherein said fluid medium comprises a mixture of water and ethylene glycol.

32. A grease filter for use in a kitchen environment, said environment including a heat generating cooking appliance for preparing cooked foods and which also generates airborne grease, fumes and particulate matter as a result of the cooking process, said filter comprising:
   (a) baffle means configured to create substantially rotational and vortex currents of said grease, fumes and particulate matter within said baffle means to promote the transfer of said airborne grease and particulate matter to said baffle means; and
   (b) collection means for collecting said airborne grease and particulate matter transferred upon said baffle.

33. The filter of claim 32, wherein said baffle means comprises a plurality of opposed slotted vane members including upstream vanes and downstream vanes, said vanes geometrically oriented to create substantially vortex currents between the upstream and opposed downstream vanes to promote the attachment of said grease and said particulate generated from said cooking appliance onto said opposed slotted vanes.

34. A grease filter for use in a kitchen environment, said environment including a grease storage container and heat generating cooking appliance which generates grease, fumes and particulate matter as a result of the cooking process, said filter comprising:

(a) an inlet side and an outlet side, said inlet side having a plurality of inlet ports and said outlet side having a plurality of outlet ports;

(b) a chamber disposed between said inlet ports and said outlet ports, said chamber geometrically configured to create rotational and vortex flow currents to promote the transfer of said grease and particulate matter to said filter; and (c) collection means to collect said grease and particulate matter which is transferred onto said filter.

35. The filter of claim 34, wherein said grease filter collects a mass of at least 10 times said grease and said particulate matter in said storage container than the mass of said grease and said particulate matter retained in said grease filter.

36. The grease filter of claim 34, wherein the flow path of said grease, particulate matter and fumes changes direction a minimum of 40 degrees at least two times between said inlet port and said outlet port.

37. A method for removing grease and particulate matter from airborne cooking fumes generated from a cooking appliance, said method comprising:

(a) circulating said cooking fumes, said particulate matter and said grease through a baffle comprising a plurality of inlet ports upstream of a plurality of outlet ports, said inlet ports and said outlet ports defined by a plurality of substantially opposing upstream vanes and downstream vanes;

(b) configuring said inlet ports and said outlet ports to induce said cooking fumes, said grease and said particulate matter to flow in a rotational and circular pattern between said plurality of inlet ports and said plurality of outlet ports;

(c) impinging said particulate matter and said grease on said inlet vanes and said outlet vanes to transfer said particulate matter and said grease from said fumes onto said upstream vanes and said downstream vanes; and (d) collecting at least some of said grease and said particulate matter which is attached to said upstream vanes and said downstream vanes in a storage container.

38. A baffle filter for trapping and collecting airborne grease and particulate matter from cooking fumes, said baffle filter comprising:

(a) A substantially rigid frame, said frame having an upstream side and a downstream side;

(b) A plurality of inlet vanes on the upstream side of said rigid frame, said inlet vanes opposed and substantially parallel to a plurality of outlet vanes on the downstream side of said rigid frame;

(c) said inlet vanes geometrically oriented towards said outlet vanes to define a chamber, said chamber creating a circular path of flow between said inlet vanes and said outlet vanes, wherein at least some of said grease and said particulate matter impinges on said inlet and said outlet vanes; and (d) a collection vessel substantially adjacent to said baffle filter to store said grease and said particulate matter impinged on said inlet vanes and said outlet vanes.

39. The baffle filter of claim 38, wherein said rigid frame is rectangular in shape.

40. The baffle filter of claim 38, wherein said rigid frame has at least one handle on the upstream side.

41. The baffle filter of claim 38, wherein said rigid frame and said inlet and outlet vanes are comprised of aluminum.

42. A baffle filter for trapping and collecting airborne grease and particulate matter from cooking fumes, said baffle filter comprising:

(a) a rectangular body;

(b) said rectangular body including four side walls which define an upstream side and a downstream side;

(c) a plurality of upstream vanes which extend between two parallel side walls on the upstream side, said upstream vanes substantially opposing a plurality of downstream vanes on the downstream side of said baffle filter;

(d) said upstream vanes and said downstream vanes each having a leading edge and trailing edge extending between said two parallel side walls, said leading edge and said trailing edge of said upstream vane defining an inlet port and said leading edge and trailing edge on said downstream vane defining an outlet port;

(e) said inlet port extending downward toward said downstream side at a minimum angle of at least about 25 degrees from the horizontal plane defined by the upstream side walls;

(f) said outlet port extending upward toward said upstream side at a minimum angle of at least about 25 degrees from the horizontal plane defined by the downstream side walls; and (g) said upstream vane trailing edge and said downstream vane leading edge defining a chamber, said chamber creating a circular flow pattern wherein at least some of said grease and said particulate matter impinge on said upstream vanes and said downstream vanes.

43. The baffle filter of claim 42, wherein said inlet ports are oriented at substantially right angles to said leading edges of said downstream vanes.

* * * * *